Jan. 29, 1952     E. L. DENNIS ET AL     2,583,550
BICYCLE BASKET SUPPORT
Filed Aug. 23, 1946     3 Sheets-Sheet 1
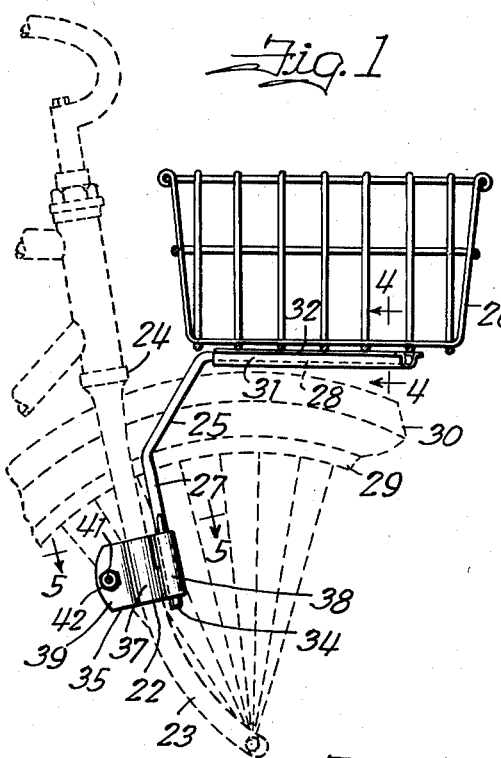
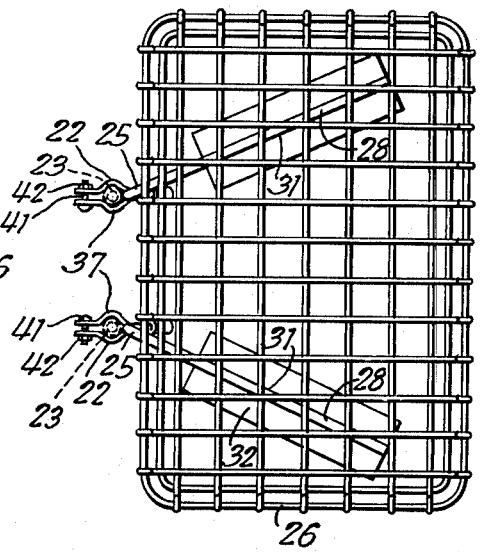
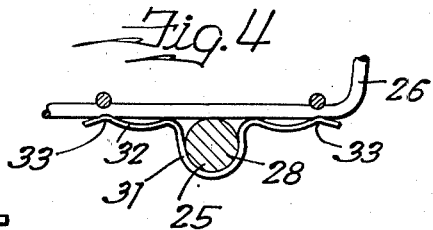
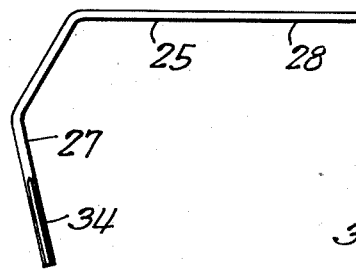
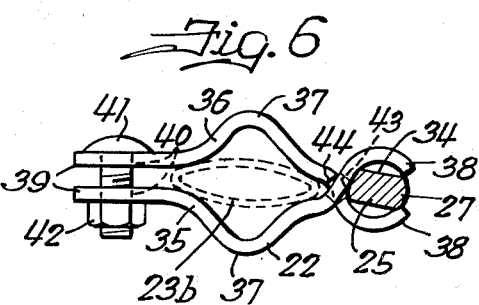
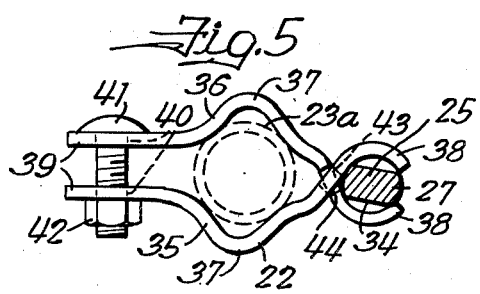
Inventors
E. Lucien Dennis
& Clarence S. Glenny

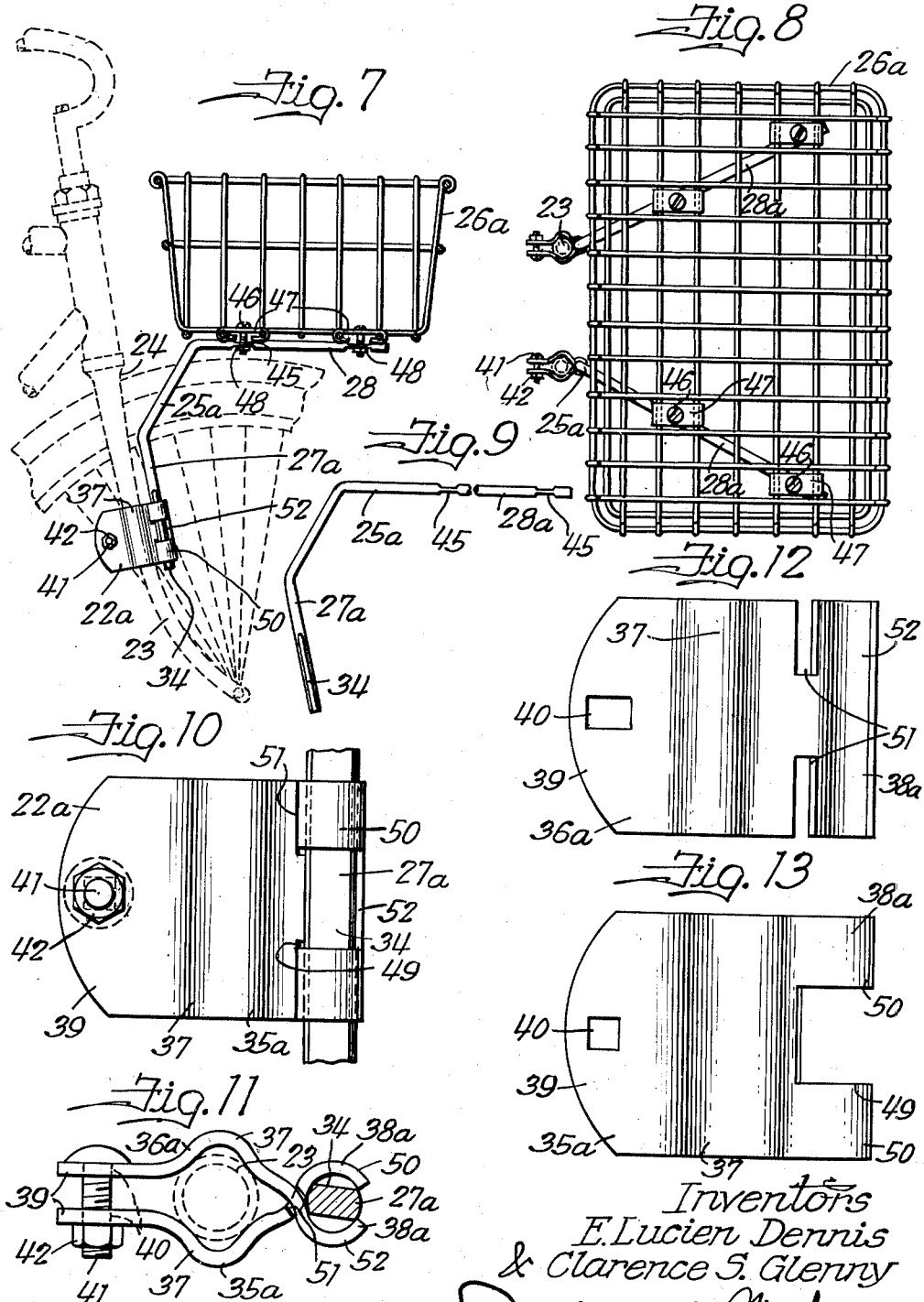

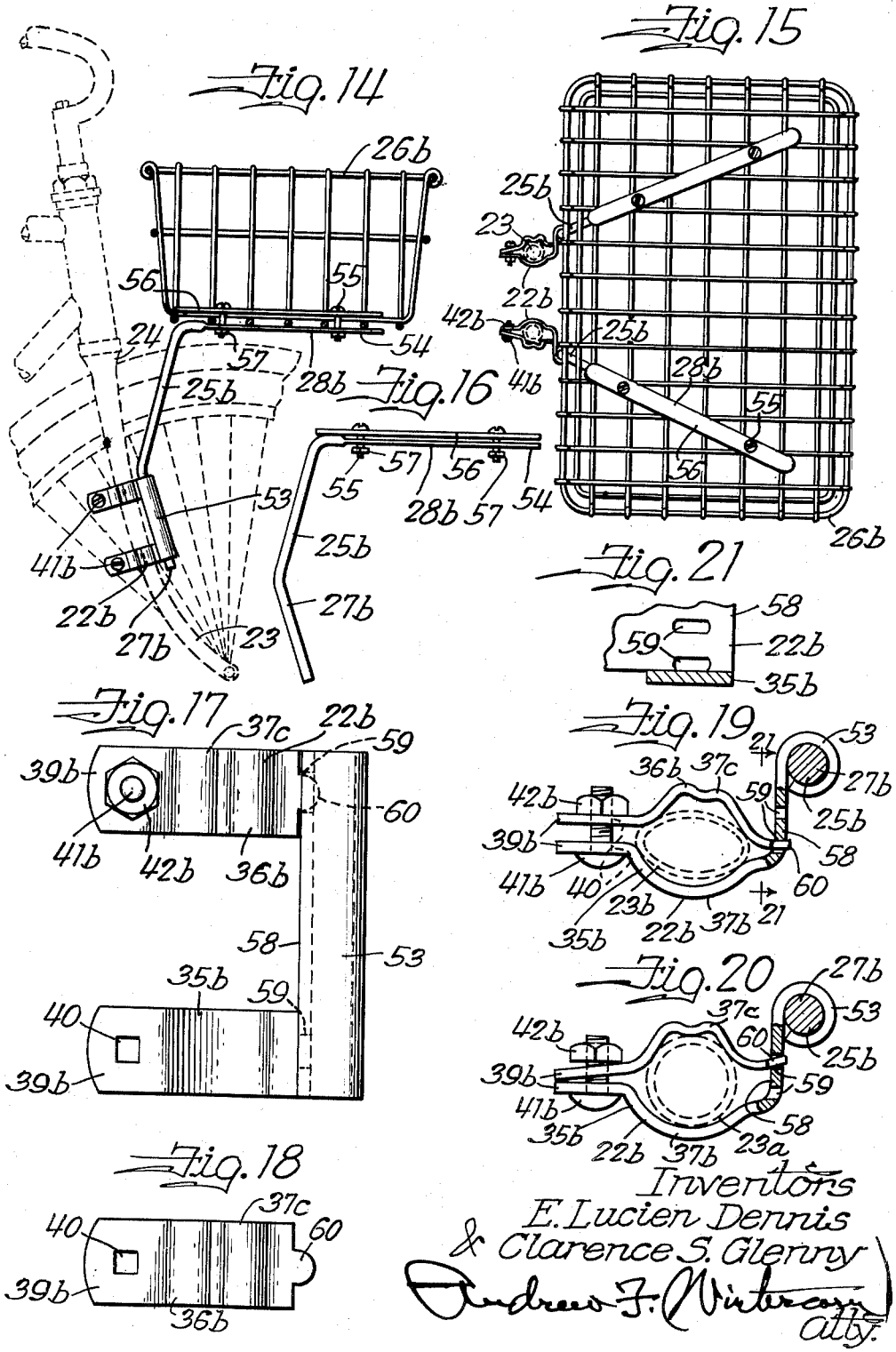

Patented Jan. 29, 1952

2,583,550

UNITED STATES PATENT OFFICE 2,583,550

BICYCLE BASKET SUPPORT

E. Lucian Dennis and Clarence S. Glenny, Rockford, Ill., assignors to The Washburn Company, Worcester, Mass., a corporation of Massachusetts Application August 23, 1946, Serial No. 692,491

16 Claims. (Cl. 224—38)

This invention relates to bicycle baskets.

Bicycle baskets have heretofore been supported on the handle bar, or handle bar stem, or partly on the handle bar and partly on the front wheel axle, or partly on the handle bar and partly on the head portion of the bicycle frame. However, due to the variety of designs of handle bars and the extent of variation in the dimensions of bicycles to which it is desired to apply bicycle baskets, many of the prior designs were not as generally applicable to bicycles as desired. It is, therefore, the principal object of our invention to provide a new type of bicycle basket support designed to be fastened in a novel manner onto the spaced legs of the front fork, whereby to be substantially universally adjustable and make the basket substantially universally applicable to all makes and sizes of bicycles within reasonable limits.

Another object is to provide a bicycle basket support of the kind mentioned comprising two generally L or V-shaped supporting brackets that are adjustably secured by one arm of the L or V to the legs of the front fork and have the other arms disposed in forwardly diverging relation in a substantially horizontal plane to support the basket above the front wheel and distribute the support over a much greater width of the basket bottom than the width of the front fork and accordingly give greater rigidity to the basket.

Another object is to provide a bicycle basket support of the kind mentioned in which the V-shaped supporting brackets are removably engaged by one arm in clips that are clamped to the legs of the front fork so that the basket can be put on or taken off quickly and easily without marring the bicycle, the clips alone being hardly noticeable so as not to detract from the appearance of the bicycle when the basket is not being used.

A still further important object of our invention is the provision of clips to be clamped to the legs of the front fork which are designed to accommodate different designs and sizes of forks, the forks of different bicycles having legs with different shaped and different sized sections.

The invention is illustrated in the accompanying drawing, in which

Fig. 1 is a side view of a bicycle basket embodying our invention shown on the front of a bicycle;

Fig. 2 is a plan view of the basket;

Fig. 3 is an isolated view of one of the two V-shaped brackets that support the basket;

Fig. 4 is an enlarged sectional detail on the line 4—4 of Fig. 1;

Figs. 5 and 6 are sections taken on the line 5—5 of Fig. 1, showing application of the same clip to front fork legs having different sections;

Fig. 7 is a view similar to Fig. 1, showing a bicycle basket of modified or alternative construction;

Fig. 8 is a plan view of the basket of Fig. 7;

Fig. 9 is an isolated view of one of the two V-shaped brackets, a portion of the bracket being broken away to conserve space in the drawing;

Figs. 10 and 11 are a side view and top view, respectively of one of the clips for adjustably securing the brackets to the legs of the front fork;

Figs. 12 and 13 are side views of the two parts of the clip;

Fig. 14 is a side view similar to Figs. 1 and 7 showing another bicycle basket of a modified or alternative construction;

Fig. 15 is a plan view of the basket of Fig. 14;

Fig. 16 is an isolated view of one of the two V-shaped brackets;

Fig. 17 is a side view of the right clip used for adjustably securing the bracket to the front fork, one of the lower clip parts being removed;

Fig. 18 is a side view of the clip part removed in Fig. 17;

Figs. 19 and 20 are top views of the left clip indicating different arrangements of the clip parts required for clamping the clip to legs having different shaped cross-sections, and Fig. 21 is a fragmentary sectional detail on the line 21—21 of Fig. 19.

Similar reference numerals are applied to corresponding parts throughout the views.

Referring first to Figs. 1 to 6, the reference numeral 22 designates two clips designed to be clamped to the two legs 23 of the front fork 24 of the bicycle to support the two brackets 25 that are attached to and support the bicycle basket 26. The brackets 25 are formed from round steel rod material bent to inverted generally L or V-shape, one arm 27 of each bracket extending downwardly in approximate parallelism with the leg 23 of the fork and held in the clip 22, and the other arm 28 extending forwardly in a substantially horizontal plane above the front wheel 29 and fender 30 for attachment in a suitable way to the bottom of the bicycle basket 26. In Figs. 1 and 2, the brackets are held in sheet metal channels 31 that have outwardly projecting flanges 32 which are spot welded at longitudinally spaced points to the wires in the bottom of the basket 26, as indicated at 33 in Fig. 4. These channels extend in forwardly diverging relation, as clearly appears in Fig. 2, and the arms 28 of the brackets 25 must therefore be entered in these channels prior to entry of the arms 27 in the clips 22. The diverging relationship of the channels 31 is of advantage from the standpoint that the brackets 25 can be assembled on the basket easily, the arms 28 being merely slipped endwise into these sleeves, and yet there is no possibility of any relative movement between the basket 26 and the brackets 25 once the brackets 25 have been assembled in the clips 22. By endwise adjustment of the brackets 25 in the channels 31, the brackets can be spaced differently at their rear ends for application to different widths of forks on different makes and sizes and styles of bicycles. The lower end portions of the arms 27 of the brackets 25 are flattened, as indicated at 34, to enable more rigidly clamping the brackets in the clips 22. Each of the clips 22 is made from two stamped sheet metal parts 35 and 36 and each of these parts is bent intermediate its ends to a V-shaped cross-section, as indicated at 37, and to a J-shaped cross-section at one end, as indicated at 38, the other end portion 39 being straight and being perforated, as indicated at 40, to receive a bolt 41 onto which a nut 42 is threaded to clamp the leg 23 of the front fork of the bicycle between the V-shaped portions 37, and at the same time clamp the leg 27 of the bracket 25 between the J-shaped portions 38, as shown in Figs. 5 and 6. The part 35 is slotted vertically from one end between the V and J-shaped portions 37 and 38 for substantially half its length, as indicated at 43, and the other part 36 is similarly slotted vertically from the other end for substantially half its length, as indicated at 44, to permit interlocking the parts 35 and 36 in the manner shown. The parts pivot on one another at the point of interlocking 43—44 to close on the arm 27 of the bracket 25 and at the same time on the leg 23 of the bicycle fork as the nut 42 is tightened on the bolt 41. The opposed J-shaped portions 38 form an oblong shaped bore therebetween to receive the oblong, substantially rectangular section of the flattened lower end portion 34 of the leg 27, and that accounts for the rigidity of the assembly when the clips 22 are clamped tightly by the tightening of the nuts 42 on the bolts 41. The V-shaped portions 37 of the clip parts 35 and 36 enable clamping a leg of circular cross-section, like that shown at 23a in Fig. 5, or a leg of flattened or oblong cross-section like that indicated at 23b in Fig. 6, with equal facility, the circular section fitting between the arms of the two V's, whereas the oblong section fits between the ends of the two V's.

A bicycle basket constructed along the lines just described is applicable substantially universally to bicycles of different designs and sizes, within reasonable limits, because the front forks of bicycles, except for differences in width and the shape of the cross-section of the legs, as already mentioned, are fairly closely similar. It is obviously a simple matter to apply the present basket to any bicycle because the clips 22 can first be attached loosely leaving freedom for up and down as well as rotary adjustment, and then after the brackets have been slipped into the channels 31 and are slipped into the clips 22 after they have been turned as necessary, the clips can be raised or lowered as required, and then tightened to clamp the bicycle basket firmly in the desired position. The rod material used for the brackets is small enough in diameter to permit also bending the brackets to whatever slight extent may be found necessary or desirable, should the user, for example, want to change the angularity of the basket. These operations are so simple that any person of average mechanical skill should have no difficulty in satisfactorily mounting the basket on the bicycle.

The construction disclosed in Figs. 7 to 13 is closely similar and comprises clips 22a clamped to the legs 23 of the front fork 24 of the bicycle in a similar manner to the clips 22, and arranged to clamp the arms 27a of L or V-shaped brackets 25a, which have the other arms 28a bolted to the bottom of the basket 26a, there being a flattened perforated portion 45 intermediate the ends of the arm 28a of each of the brackets 25a through which bolts 46 are entered for fastening the basket. The bolts 46 extend through holes in sheet metal plates 47 spanning adjacent wires on the bottom of the basket 26a and through holes in the arms 28a and receive nuts 48 on their projecting lower ends to fasten the basket securely when the bolts or nuts are tightened. The arms 28a are disposed in forwardly diverging relation to give more rigid support for the basket 26a. The clips 22a are each made from two stamped sheet metal parts 35a and 36a, similar to the parts 35 and 36 previously described, in so far as the V-shaped portions 37 for clamping the leg of the fork are concerned, and also the straight perforated ends 39 that receive the bolt 41 and nut 42 for tightening the clip on the leg of the fork. The J-shaped ends 38a, however, are slotted differently, there being a transverse middle slot 49 in the part 35a defining upper lower knuckle portions 50 which can be slipped through vertical slots 51 provided in the upper and lower portions of the part 36a to cooperate with a single elongated knuckle portion 52 provided on the part 36a. The lower end portion of the arm 27a of each of the brackets 25a is flattened, as shown at 34, to cooperate with the clips 22a similarly as in the other form. The rigid fastening of the brackets 25a on the basket make it necessary to rely partly on the rotary adjustability of the clips 22a and partly on the fact that the brackets 25a may be bent more or less easily to spread their lower ends apart or bring them closer together, to compensate for differences in widths of the forks on different bicycles.

The construction disclosed in Figs. 14 to 21 is also closely similar to that disclosed in Fig. 1, but, whereas, in the other two forms described, the brackets 25 and 25a are removable only when the bolts on the clips 22 and 22a are loosened, the arms 27b of the brackets 25b in this third form are designed to be slipped into or out of tubular holders 53 without loosening the clips 22b, thus permitting attaching the basket 26b only when it is needed for carrying packages, the basket being left off otherwise. The arms 28b of the brackets 25b are flattened, as indicated at 54, and perforated to receive the lower ends of bolts 55 that are extended through metal straps or cleats 56, the latter resting flatly on the bottom of the basket and the flattened portions 54 of the brackets having engagement under the basket so that when nuts 57 that are threaded on the projecting ends of the bolts are tightened, the basket is fastened securely to the brackets. Here again, the arms 28b extend in forwardly diverging relation to make for greater rigidity of the basket with the brackets. The lower end portions of the arms 27b of the brackets 25b that engage in the holders 53 are shown as cylindrical to fit snugly in cylindrical bores in the holders, but, of course, they may be flattened on one or both sides, like in the other two forms, for a non-rotatable fit in non-circular bores provided in the holders, if desired. The clips 22b are made of two stamped sheet metal parts 35b and 36b. The part 35b has a laterally outwardly projecting front end portion 58, the extremity of which is curled to provide the tubular holder 53. The clips shown in Figs. 19 and 20 are both for the left leg of the front fork and the holder 53 is therefore spaced to the left of the left leg to afford ample clearance with respect to the spokes of the wheel. The holder 53 on the right hand clip appearing in Figs. 14 and 17 is spaced, to the right of the right leg of the front fork for the same reason. The connecting web 58 has a plurality of vertical slots 59 in its upper and lower end portions in laterally spaced relation to accommodate lugs 60 provided on the front end of the clip parts 36b. Where the legs of the front fork are of large circular cross-section, as illustrated in Fig. 20, the lugs 60 will be entered in the outer slots, but where the legs are of smaller or narrower cross-section, the lugs will be entered in the inner slots, as shown in Fig. 19. The intermediate portion 37b of the clip part 35b is arched, as shown in Figs. 19 and 20, to accommodate either shaped cross-section. The intermediate portion 37c of the other clip part 36b is generally V-shaped for the same reason. Bolts 41b are entered through registering holes in the inner end portions 39b of the two clip parts and receive nuts 42b. Two bolts are provided on each clip to insure a good clamping action when the nuts 42b are tightened. Here again, it should be clear that the clips will not be fastened tightly right away but will be attached loosely at first so as to permit raising or lowering the same as required when the arms 27b of the bracket 25b have been slipped into the holders 53, the clips having, of course, been turned before hand relative to the legs of the fork to the right position to permit such assembly. The brackets 25b are also easily adjustable laterally relative to the bottom of the basket before the bolts 55 are tightened.

It should be apparent from the foregoing description that the present type of bicycle basket support might with little or no change be applied to the rear fork of a bicycle as a luggage carrier. The angularity of the arms of the L or V-shaped brackets could, of course, be changed easily to suit that application, and in fact, a purchaser could easily bend the brackets to the extent necessary to suit such an application.

It is believed the foregoing description conveys a good understanding of the objects and advantages of our invention. The appended claims have been drawn to cover all legitimate modifications and adaptations.

We claim:

1. A carrier for application to a cycle having a front wheel and fork and a handle bar, the application being independent of the handle bar, said carrier comprising two inverted generally L-shaped supporting brackets disposed in substantially vertical planes on opposite sides of the front wheel, both arms of each bracket being elongated, one arm of each bracket being disposed in a substantially horizontal plane above said wheel, the other arms of said brackets extending downwardly and inclined from a vertical like the legs of the fork and disposed adjacent and substantially parallel to the legs of the fork, means for securing the bottom of a basket to the first mentioned elongated arms of said brackets in supporting engagement with said arms substantially the full length thereof, and elongated clamp means rigidly secured to the legs of the fork in vertically adjusted position relative thereto and adapted for rigidly securing the last mentioned elongated arms of said brackets to the legs of the fork, the first mentioned elongated arms of said brackets extending in outwardly diverging relation under the bottom of the basket so as to provide proportionately widely spaced supports for the basket despite the relatively close spacing of the brackets necessitated by their connection with the clamp means on the closely spaced legs of the fork.

2. As an article of manufacture, a bracket for use in supporting a bicycle basket or the like on the fork of a bicycle, said bracket comprising an elongated bar bent to an inverted substantially L-shape so as to provide one arm in a substantially horizontal plane for attachment to and support of the basket and another arm extending downwardly in relation to the first arm at substantially the same inclination with respect to a vertical as the leg of the bicycle fork to which said arm is adapted to be secured, the last mentioned arm of said bracket being flattened to an oblong section, the major dimension of which is disposed substantially in the plane of the leg of the fork, the other arm of said bracket also having one or more portions thereof flattened to oblong cross-section in a horizontal plane, the flattened portions having holes provided therein to receive fastening elements.

3. As an article of manufacture, a bracket for use in supporting a bicycle basket or the like on the fork of a bicycle, said bracket comprising an elongated bar bent to an inverted substantially L-shape so as to provide one arm in a substantially horizontal plane for attachment to and support of the basket and another arm extending downwardly in relation to the first arm at substantially the same inclination with respect to a vertical as the leg of the bicycle fork to which said arm is adapted to be secured, the horizontal arm of said bracket being flattened to oblong cross-section in a horizontal plane and having holes provided therein to receive fastening elements.

4. As an article of manufacture, a bracket for use in supporting a bicycle basket or the like on the fork of a bicycle, said bracket comprising an elongated bar bent to an inverted substantially L-shape so as to provide one arm in a substantially horizontal plane for attachment to and support of the basket and another arm extending downwardly in relation to the first arm at substantially the same inclination with respect to a vertical as the leg of the bicycle fork to which said arm is adapted to be secured, the first mentioned arm of said bracket having longitudinally spaced portions thereof flattened to oblong section in a horizontal plane and having holes provided in the flattened portions adapted to receive fastening elements.

5. A bicycle basket adapted to be secured to the front wheel embracing fork of a bicycle for support independently of the handle bar, said basket comprising attaching means secured to the bottom of the basket at laterally spaced points at equal distances from the ends, respectively, of the basket, a pair of inverted generally L-shaped rods serving as supporting brackets providing an elongated substantially horizontal arm on each, said arms having elongated portions thereof connected to said attaching means for rigid support of the basket on the rods above the front wheel in the bicycle fork, said rods also providing an elongated upright arm on each extending downwardly relative to the rear end of the other arm, these arms being laterally spaced approximately like the legs of the bicycle fork, and other attaching means adapted to be fastened adjustably and detachably to the legs of the fork at opposite sides of the front wheel and having elongated portions of the last mentioned arms rigidly connected thereto for rigid support of the basket on said fork.

6. A bicycle basket as set forth in claim 5, wherein the attaching means on the bottom of the basket is disposed so as to hold the horizontal arms of said rods in outwardly diverging relation relative to the front wheel embracing fork, so as to provide proportionately widely spaced supports for the basket despite the relatively close spacing of the attaching means on the legs of the fork.

7. A bicycle basket as set forth in claim 5, wherein the attaching means on the bottom of the basket is disposed so as to hold the horizontal arms of said rods in outwardly diverging relation relative to the front wheel embracing fork, so as to provide proportionately widely spaced supports for the basket despite the relatively close spacing of the attaching means on the legs of the fork, the bicycle basket being formed of wire and the bottom wall including horizontally spaced wires, and said attaching means comprising elongated horizontal plates having looped ends bent around said spaced wires for securing the plates to the bottom wall of the basket and including fastening elements extending through holes provided in said plates and entered in registering holes provided in said arms.

8. A bicycle basket adapted to be secured to the front wheel embracing fork of a bicycle for support independently of the handle bar, said basket comprising attaching means secured to the bottom of the basket at laterally spaced points at equal distances from the ends, respectively, of the basket, a pair of inverted generally L-shaped rods serving as supporting brackets providing an elongated substantially horizontal arm on each, said arms having elongated portions thereof connected to said attaching means for rigid support of the basket on the rods above the front wheel in the bicycle fork, said rods also providing an elongated upright arm on each extending downwardly relative to the rear end of the other arm, these arms being laterally spaced approximately like the legs of the bicycle fork, and other attaching means adapted to be fastened adjustably and detachably to the legs of the fork at opposite sides of the front wheel and having elongated portions of the last mentioned arms rigidly connected thereto for rigid support of the basket on said fork, the attaching means on the bottom of the basket being disposed so as to hold the horizontal arms of said rods in outwardly diverging relation relative to the front wheel embracing fork so as to provide proportionately widely spaced supports for the basket despite the relatively close spacing of the attaching means on the legs of the fork, said basket being formed of wire and the bottom wall including horizontally spaced wires, and said attaching means comprising elongated strips disposed over the tops of said horizontally spaced wires in register with the horizontal arms of said rods therebeneath, and including fastening elements extending through holes provided in said strips and entered in registering holes provided in said arms.

9. A bicycle basket as set forth in claim 5, wherein the attaching means on the bottom of the basket is disposed so as to hold the horizontal arms of said rods in outwardly diverging relation relative to the front wheel embracing fork, so as to provide proportionately widely spaced supports for the basket despite the relatively close spacing of the attaching means on the legs of the fork, the attaching means including generally tubular members attached horizontally to the bottom of the basket, in which the horizontal arms of said rods are slidably engaged for easy insertion and removal.

10. A bicycle basket as set forth in claim 5, wherein the attaching means on the bottom of the basket is disposed so as to hold the horizontal arms of said rods in outwardly diverging relation relative to the front wheel embracing fork, so as to provide proportionately widely spaced supports for the basket despite the relatively close spacing of the attaching means on the legs of the fork, the attaching means including generally tubular members attached horizontally to the bottom of the basket, in which the horizontal arms of said rods are slidably engaged for easy insertion and removal, said construction and arrangement also permitting variation in the spacing of the upright arms for attachment to the differently spaced legs of different bicycle forks.

11. As an article of manufacture, a bracket for use in supporting a bicycle basket or the like on the fork of a bicycle, said bracket comprising an elongated bar bent to an inverted substantially L-shape so as to provide one arm in a substantially horizontal plane for attachment to and support of the basket and another arm extending downwardly in relation to the first arm at substantially the same inclination with respect to a vertical as the leg of the bicycle fork to which said arm is adapted to be secured, the first mentioned arm of said bracket having one or more portions thereof flattened to oblong cross-section in a horizontal plane, the flattened portions having holes provided therein to receive fastening elements for fastening the basket to the arm.

12. A carrier for application to a cycle having a front wheel and fork and a handle bar, the application being independent of the handle bar, said carrier comprising two inverted generally L-shaped supporting brackets disposed in substantially vertical planes on opposite sides of the front wheel with one elongated arm of each bracket disposed in a substantially horizontal plane above said wheel, the other elongated arms of said brackets extending downwardly and being disposed adjacent and substantially parallel to the legs of the fork, means for securing the bottom of a basket or the like to the first mentioned arms of said brackets in supporting engagement with said arms substantially the full length thereof, and means rigidly secured to the legs of the fork for support of said brackets providing elongated tubular holders substantially parallel to the legs of the fork into which the downwardly extending arms of the brackets are detachably slidably engageable with a close fit, without necessity of loosening and tightening said supporting means, for demountably and yet rigidly supporting the basket together with the brackets on the fork, whereby the basket may be removed and replaced repeatedly without disturbing the bracket supporting means.

13. A carrier for application to a cycle having a front wheel and fork and a handle bar, the application being independent of the handle bar, said carrier comprising two inverted generally L-shaped supporting brackets disposed in substantially vertical planes in rearwardly converging relationship on opposite sides of the front wheel with one elongated arm of each bracket disposed in a substantially horizontal plane above said wheel, the other elongated arms of said brackets extending downwardly and being disposed adjacent and substantially parallel to the legs of the fork, means for securing the bottom of a basket or the like to the first mentioned arms of said brackets in supporting engagement with said arms substantially the full length thereof, and means rigidly secured to the legs of the fork for support of said brackets providing elongated tubular holders substantially parallel to the legs of the fork into which the downwardly extending arms of the brackets are detachably slidably engageable with a close fit, without necessity of loosening and tightening said supporting means, for demountably and yet rigidly supporting the basket together with the brackets on the fork, whereby the basket may be removed and replaced repeatedly without disturbing the bracket supporting means, the first mentioned arms of said brackets extending in outwardly diverging relation under the bottom of the basket so as to provide proportionately widely spaced supports for the basket despite the relatively close spacing of the brackets.

14. A carrier for application to a cycle having a front wheel and fork and a handle bar, the application being independent of the handle bar, said carrier comprising two inverted generally L-shaped supporting brackets disposed in substantially vertical planes on opposite sides of the front wheel with one elongated arm of each bracket disposed in a substantially horizontal plane above said wheel, the other elongated arms of said brackets extending downwardly and being disposed adjacent and substantially parallel to the legs of the fork, means for securing the bottom of a basket or the like to the first mentioned arms of said brackets in supporting engagement with said arms substantially the full length thereof, and a pair of supports for the basket each consisting of a clamp portion adjustably secured to a leg of the fork and an elongated holder portion constituting a rigid extension of a portion of the clamp portion and therefore adjustable with it up and down on the leg of the fork and adapted to have a detachable telescoping connection with the associated downwardly extending arm of the associated one of said brackets for demountably and yet rigidly supporting the basket together with the brackets on the fork, so that the basket may be removed and replaced repeatedly without necessity of removal or disturbing the adjustment of said last mentioned supports.

15. A clamp device adapted for application to the longitudinally curved leg of a bicycle fork for detachably securing an element in substantially parallel spaced relation thereto, said clamp device comprising an elongated body member having two arms extending in the same direction from the opposite ends thereof which are both bent intermediate their ends to provide a recess to accommodate one side of the curved leg of the fork the free end portions of said arms being attaching portions and having openings provided therein to receive clamping bolts, the body member having a longitudinal edge portion bent substantially at right angles to the other end portions of said arms in which slots are provided in different spaced relations to said arms, the said edge portion being further bent to define an elongated tubular portion adapted to receive the element to be attached to said fork, two clamping plates each of which cooperates with one of the aforesaid arms and is bent intermediate its ends to provide a recess to accommodate the other side of the curved leg of the fork, one end portion of each of said clamping plates having a lug formed thereon adapted to engage in either of the aforesaid slots and the other end portion being an attaching portion and having a hole provided therein adapted to receive a clamping bolt entered through the associated attaching portion on one of the aforesaid arms, and clamping bolts entered in registering openings in the attaching portions.

16. A clamp device as set forth in claim 15, wherein the bends intermediate the ends of the arms are of arcuate form to accommodate in the middle portion the leg of a bicycle fork of circular section out of contact with the end portions of the arcuately bent portion and to accommodate the leg of a bicycle fork of elliptical section in contact only with the end portions of the arcuately bent portion, and wherein the two co-operating clamping plates are bent intermediate the ends to an approximate W form for contact at three circumferentially spaced points on the other side of the leg of a bicycle fork of circular section and contact at two more widely spaced points on the same side of the leg of a bicycle fork of elliptical section.

E. LUCIAN DENNIS.
CLARENCE S. GLENNY.

REFERENCES CITED

The following references are of record in the file of this patent:

UNITED STATES PATENTS

| Number | Name | Date |
|---|---|---|
| 795,782 | Porter | July 25, 1905 |
| 822,226 | West | May 29, 1906 |
| 919,988 | Witzal | Apr. 27, 1909 |
| 1,040,620 | Clark | Oct. 8, 1912 |
| 1,260,937 | Muller | Mar. 26, 1918 |
| 1,359,329 | Carson | Nov. 16, 1920 |
| 1,460,760 | McGee | July 3, 1923 |
| 1,908,535 | Pawsat | May 9, 1933 |
| 2,010,283 | White | Aug. 6, 1935 |
| 2,010,479 | Dennis | Aug. 6, 1935 |
| 2,256,629 | Schwinn | Sept. 23, 1941 |
| 2,327,537 | Lyman | Aug. 24, 1943 |
| 2,400,512 | Hurtel | May 21, 1946 |

FOREIGN PATENTS

| Number | Country | Date |
|---|---|---|
| 6,466 | Great Britain | of 1901 |
| 10,175 | Great Britain | of 1908 |
| 201,618 | Great Britain | Aug. 1, 1923 |
| 415,447 | Germany | Feb. 5, 1924 |
| 540,051 | France | Apr. 11, 1922 |